United States Patent [19]

Schauder

[11] Patent Number: 5,594,636
[45] Date of Patent: Jan. 14, 1997

[54] MATRIX CONVERTER CIRCUIT AND COMMUTATING METHOD

[75] Inventor: Colin D. Schauder, Murrysville, Pa.

[73] Assignee: Northrop Grumman Corporation, Los Angeles, Calif.

[21] Appl. No.: 267,730

[22] Filed: Jun. 29, 1994

[51] Int. Cl.$^6$ .......................... H02M 5/20; H02M 5/257
[52] U.S. Cl. ............................. 363/160; 363/159
[58] Field of Search ........................... 363/159, 160

[56] References Cited

U.S. PATENT DOCUMENTS

| | | | |
|---|---|---|---|
| 4,642,751 | 2/1987 | Schauder | 363/159 |
| 4,648,022 | 3/1987 | Schauder | 363/159 |
| 4,697,131 | 9/1987 | Schauder et al. | 318/762 |
| 4,697,230 | 9/1987 | Neft | 363/163 |
| 4,707,651 | 11/1987 | Schauder | 318/800 |
| 4,805,082 | 2/1989 | Heinrich et al. | 363/129 |
| 4,833,588 | 5/1989 | Schauder | 363/159 |
| 4,862,054 | 8/1989 | Schauder | 318/800 |
| 4,885,518 | 12/1989 | Schauder | 318/798 |
| 4,959,602 | 9/1990 | Scott et al. | 318/803 |
| 4,962,339 | 10/1990 | Schauder | 318/798 |
| 5,005,115 | 4/1991 | Schauder | 363/159 |
| 5,168,204 | 12/1992 | Schauder | 318/800 |
| 5,182,508 | 1/1993 | Schauder | 318/801 |
| 5,198,746 | 3/1993 | Gyugyi et al. | 323/207 |

OTHER PUBLICATIONS

Charles L. Neft and Colin D. Schauder, "Theory and Design of a 30-hp Matrix Converter", IEEE Transactions of Industry Applications, vol. 28, No. 3, May/Jun. 1992.

Primary Examiner—Stuart N. Hecker
Attorney, Agent, or Firm—Philip A. Florenzo

[57] ABSTRACT

A method and apparatus for AC-to-AC power conversion wherein commutation from one switch in a switching group to a second switch is effected while both switches are enabled simultaneously without causing a short circuit between the phase input lines associated with each respective switch. Each switch in a switching group is bidirectional and polarity-controlled, and may be selectively enabled to conduct only negative-polarity or positive-polarity current, or may be disabled. An overvoltage clamping circuit is also provided with each switch. A switch gating control circuit is employed to provide selective operation of the switches in a particular switch group.

12 Claims, 6 Drawing Sheets

FORCED COMMUNICATION ($V_S > 0$)

MATRIX CONVERTER CIRCUIT AND COMMUTATING METHOD

BACKGROUND OF THE INVENTION

1. Field of the Invention

The present invention relates to the field of direct AC-to-AC converter systems in general and more particularly to matrix converters, i.e., wherein the conversion is performed through a plurality of bilateral switches controlled for conduction according to a preselected switching sequence.

2. Description of the Prior Art

See for instance, U.S. Pat. Nos. 4,648,022, 4,833,588, 4,962,339, and 5,005,115, all to C. D. Schauder. These patents are hereby incorporated by reference.

Typically, a matrix converter or "forced commutated cycloconverter" uses nine bi-directional AC power switches to achieve AC-to-AC conversion.

Conceptually, the switches are arranged in three groups of three, each group being associated with a particular output line. Within such a group, the switches are operated so that the group output voltage consists of a sequence of samples of the input line voltages.

Generally, the matrix converter provides unrestricted frequency conversion, high quality input and output wave forms, and unity input displacement factor. It has the inherent capability to regenerate from a load to the AC mains supply and is particularly attractive because it does not require bulk energy storage components. In principle, a matrix converter switching at a high frequency can have a smaller physical size than other power converter types with the same capability.

With current matrix converter circuits, two rules must be followed. First, it is important that one, and only one, switch in a group should be closed at a time. Closing more than one switch in a group would short circuit the input lines. Second, at least one switch in a group should be closed at a time. Opening all switches in a group could interrupt the load current which is always supported by load circuit inductance. By opening all three switches in each group, a high voltage develops across the switches. To accommodate potentially high voltages which may develop as a result of forced commutation, matrix converter circuits typically include a voltage clamp.

One existing forced-commutation process that observes these switching rules steers the output load current from a closed switch, SW1, within a group to the next switch, SW2, in sequence within a group. The voltage across SW1 rapidly rises to a preselected level limited by a voltage clamp when SW1 is opened. The preselected level can exceed the maximum phase-to-phase source voltage. While the load current flows through the voltage clamp on SW1, a small delay, or underlap period, is allowed to expire before SW2 is turned on. A commutation loop current, flowing in the closed loop formed by SW1, SW2 and two phases of the power source, then rises approximately linearly from zero to the load current. When the commutation loop current equals the load current, the current through the SW1 voltage clamp reaches zero and the entire load current flows in SW2. In practice, the underlap period is partly intentional to account for imprecise detection of the recovery instant of SW1 and partly due to the turn-on delay of SW2.

During the commutation process, the load current is substantially constant, supported by the inductive load. When SW1 is turned off, the current through SW1 falls to zero and the current is diverted through a voltage clamp associated with SW1. The commutation loop current continues to flow solely through the voltage clamp during the underlap period until the next switch in the sequence, here SW2, is turned on. As a result, a substantial amount of power is absorbed by the voltage clamp every time switching occurs, from the time SW1 is turned off until SW2 has begun to carry the entire load current. This power is unavailable for work by the load, and is lost.

There is a need, therefore, for a matrix converter switch and commutating method which reduce the amount of power lost during the commutation process using current matrix converter circuits and commutation methods. This need and others are satisfied by the invention which is directed to matrix converter circuits and commutation methods.

SUMMARY OF THE INVENTION

The invention provides for a commutation method for efficient, direct AC-to-AC power conversion and an apparatus that effects the commutation method.

The commutation method herein permits two switch circuits within the same switching group to be enabled simultaneously without shorting the AC mains associated with the individual switch circuits. The method may require the continuous determination of the desired polarity of the current which is to flow through any particular switching group at a particular time. Once the proper polarity is selected, the individual switching circuits within each switching group can be enabled to permit current flow of the desired polarity and block current of reverse polarity.

With the switch circuits of a switching group thus enabled, a second switch circuit within a group may be enabled while a first switch circuit within the same switching group is still energized with the load current. This method permits natural commutation from the first switch circuit to the second switch circuit to occur whenever possible during the overlapping period of first switch circuit and second switch circuit enabling. If natural commutation does not occur, or is incomplete, the first switch circuit is disabled, forced commutation is effected, and the second switch circuit conducts the full load current. If a change in current polarity is indicated, then all switch circuits within a switching group may be momentarily disabled to prevent shorting of the AC mains associated with the individual switching circuits.

One apparatus which embodies the commutation method herein includes polarity-sensitive switching devices that can be controlled by a matrix converter controller. Each of these switching devices can provide unidirectional current control and flow in either of two directions, respective of the desired current polarity, while blocking the flow of current in the opposite direction. In one presently preferred embodiment of the present invention, the switching devices can be controlled by a gating control means that determines which power switch is enabled to conduct current and which polarity of current flow is enabled. Accordingly, the matrix converter controller can act in concert with the gating control means to provide desired enabling signals to each polarity-controlled, bi-directional switch.

In one presently preferred embodiment, a gating control means can use input data such as a group current reference signal and group switch selection data to determine the desired polarity of the load current through the switches and to transmit the desired state of the switches within a group to the switch conduction enable circuit. The polarity-controlled, bi-directional switch permits particular switches operable on a particular line phase to be enabled at preselected times and regulates the initiation and duration of the switch gating overlap period, as well as current flow. The switch gating control circuit can receive reference signals from the matrix converter controller, as well as from the AC power supply main, to facilitate the selection of the preferred polarity for the switches in a switch group. In addition, whenever the switch gating control circuit senses that a change in polarity selection is indicated, a brief underlap period may be imposed upon all switches in the group, during which no switches are enabled for conduction in any direction.

DESCRIPTION OF FIGURES

FIG. 1b is a diagrammatic representation of certain qualitative parameters pertinent to the forced commutation represented in FIG. 1a.

FIG. 2b is a diagrammatic representation of certain qualitative parameters pertinent to the natural commutation represented in FIG. 2a.

FIG. 3b is a diagrammatic representation of certain qualitative parameters pertinent to the forced commutation represented in FIG. 3a.

DESCRIPTION OF PREFERRED EMBODIMENTS

The method and apparatus of the presently preferred embodiments provide unrestricted frequency conversion, high quality input and output waveforms, and a unity input displacement factor, and may be used at high switching frequencies and high power levels. Because about half of the commutations can be completely or partially natural, switching losses can be substantially reduced. Due to the use of an overlap gating period, and the elimination of systematic underlap gating intervals, the additional circuitry previously required to detect the recovery of each switch may be eliminated.

Other details, objects and advantages of the invention will become apparent as the following description of a present preferred embodiment thereof and a present preferred method of practicing the same proceeds. The accompanying drawings show presently preferred embodiments of the invention and a method of practicing the invention.

Figure 1A:
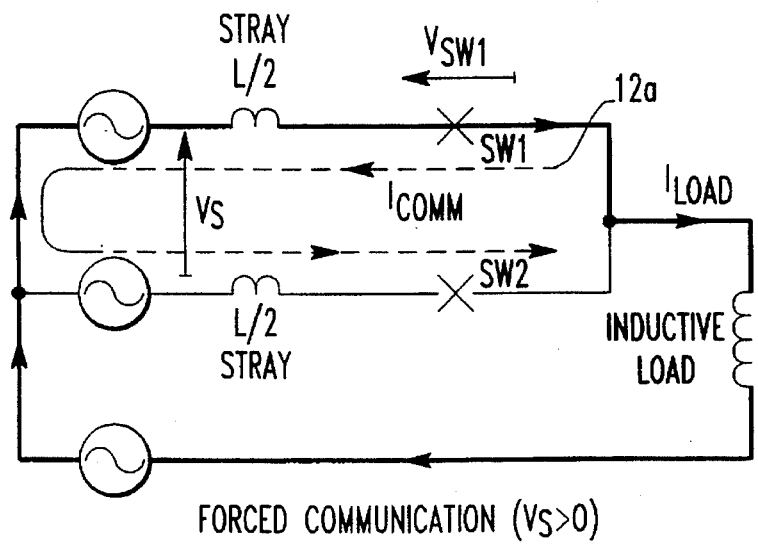
FIG. 1a is a diagrammatic representation of a forced commutation according to the prior art.
Figure 1B:
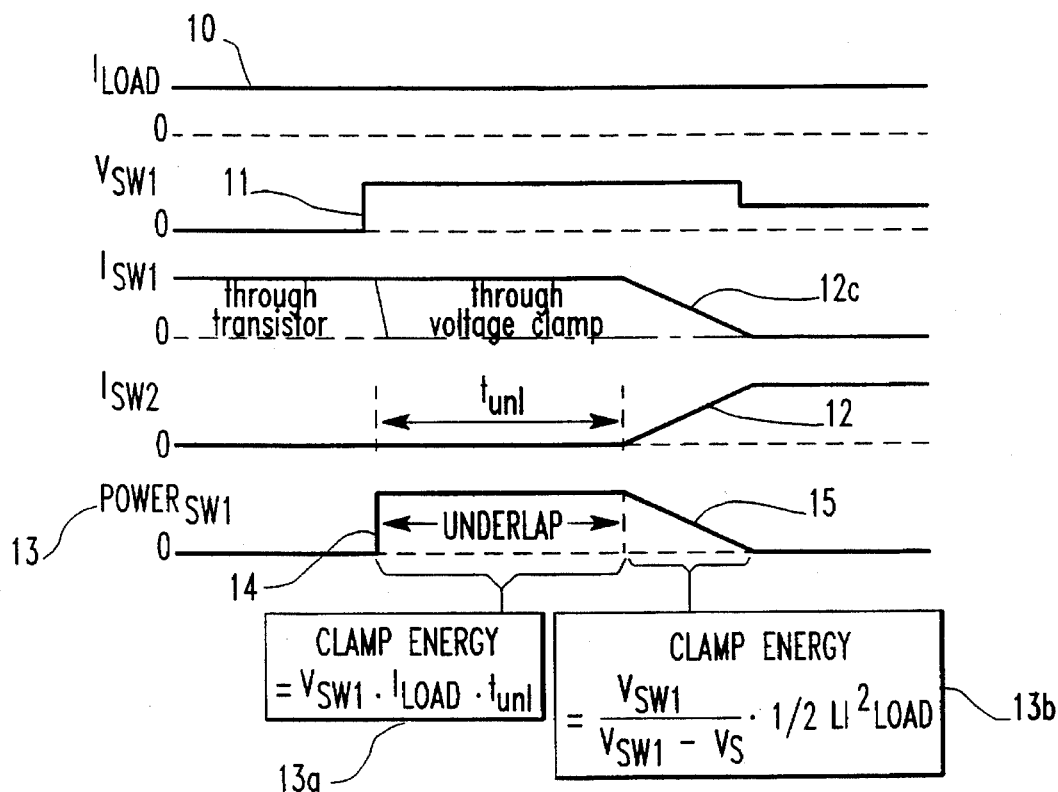

FIG. 1a illustrates forced commutation with switch gating underlap found in the prior art, with FIG. 1b indicating the qualitative states of the parameters pertinent to the forced commutation illustrated in FIG. 1a. This forced commutation process is used to steer the output load current from a closed switch, SW1, to the next switch, SW2, in sequence within a group. When switch SW1 is opened, the voltage, 11, across SW1 rapidly rises to a level defined by a voltage clamp. While the load current, 10, flows through the voltage clamp on SW1, an underlap period, 14, is allowed to expire before SW2 is gated ON. A commutation loop current, 12a, then rises approximately linearly from zero to the load current as seen in trace 12 for the current through SW2. When the commutation current equals load current, the current through the SW1 voltage clamp reaches zero, as seen in trace 12c for the current through SW1, and the entire load current flows in SW2. In practice, the underlap period, 14, is partly intentional to account for imprecise detection of the recovery instant of SW1, and partly due to the turn-on delay of SW2. This commutation process causes considerable energy to be absorbed, and load power lost, by the voltage clamp every time it occurs. The energy lost during this commutation process includes a component 13a proportional to the length of underlap period 14, and another 13b related to the inductance of the commutation loop.

The commutation method herein can employ a simple switching control strategy that allows the converter to use natural, instead of forced, commutation whenever possible. Losses are further reduced through the elimination of systematic switching underlap intervals. However, selective underlap intervals may be imposed to prevent shorting of the AC mains where one switch is positively enabled and one switch is negatively enabled at the same time within the same group in the interval during which the polarity enable transition occurs.

At any time, a switch group of an AC matrix converter can be selected for either positive or negative current conduction. The decision to select for either positive or negative current conduction can be made continuously. This decision can be facilitated when the matrix converter is operated under closed-loop current control, so that a desired reference current value is available for each switch group. In addition, an actual current-derived parameter measured from the matrix converter output circuit may be used in addition to, or in place of, the closed-loop reference current value. Once the permissible current polarity of a group of switches has been selectively determined, current of reverse polarity is blocked and more than one power switch circuit in the group may be enabled at a particular time, without shorting the AC mains.

Figure 2A:
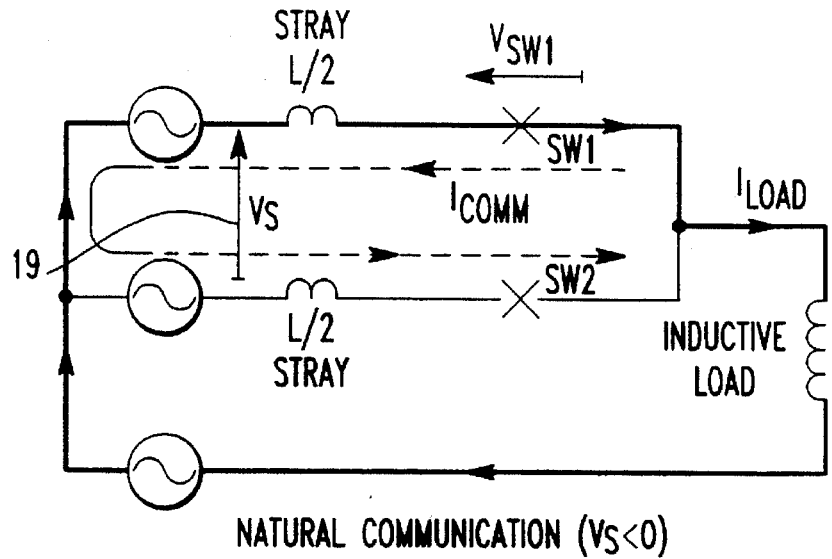
FIG. 2a is a diagrammatic representation of a natural commutation according to the present invention.

FIG. 2a illustrates a natural commutation with switch gating overlap according to the present invention.

Figure 2B:
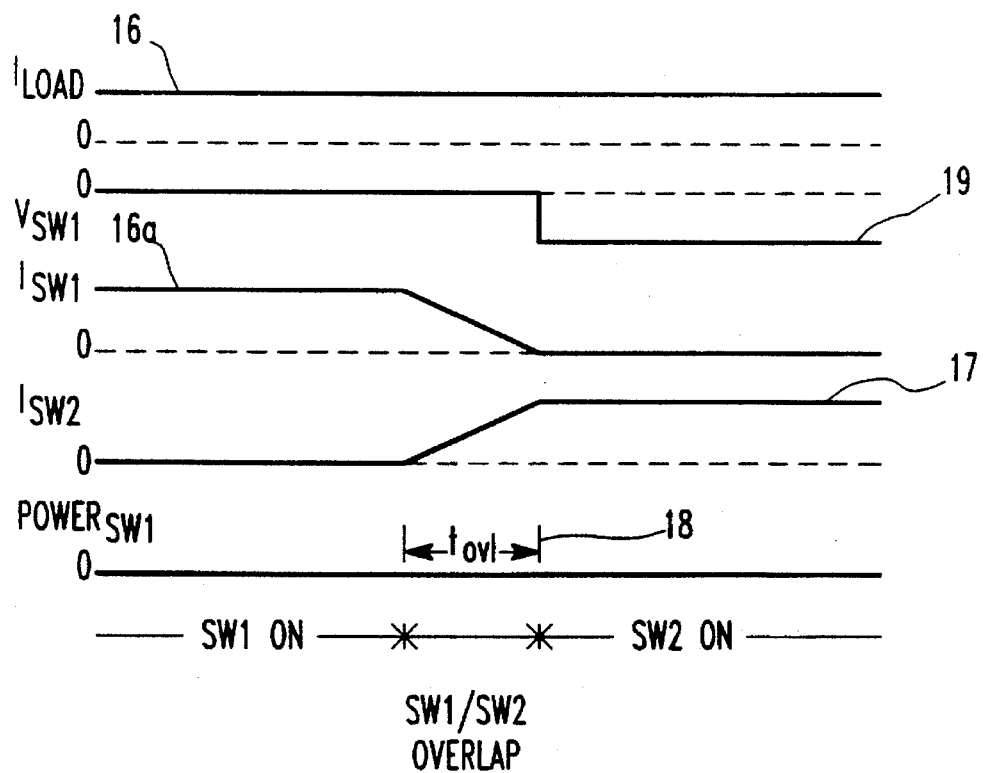

FIG. 2b illustrates the qualitative states of the parameters pertinent to the natural commutation illustrated in FIG. 2a. In FIG. 2a, the polarity of the source voltage, 19, can be assumed to be negative, and the switch group in the figure is enabled for positive current conduction. In this case, the load current, 16, flows through SW1 initially as seen in trace 16a for the current in SW1. The first action taken is to turn ON the next switch in the switching sequence, SW2, while SW1 is left ON. A commutation loop current will begin to flow and the load current 16 commutates in a natural way to SW2, as seen in tract 17 for the current in SW2, while current 16a in SW1 may be reduced to zero. The length of the overlap period 18 is regulated such that natural commutation is possible, even likely, during overlap period 18. In the case shown in FIGS. 2a and 2b, the natural commutation is completed within the underlap period 18. However, if natural commutation has not concluded by the end of overlap period, 18, the first switch circuit is disabled and forced commutation of the load current to the second switch circuit is effected.

Figure 3A:
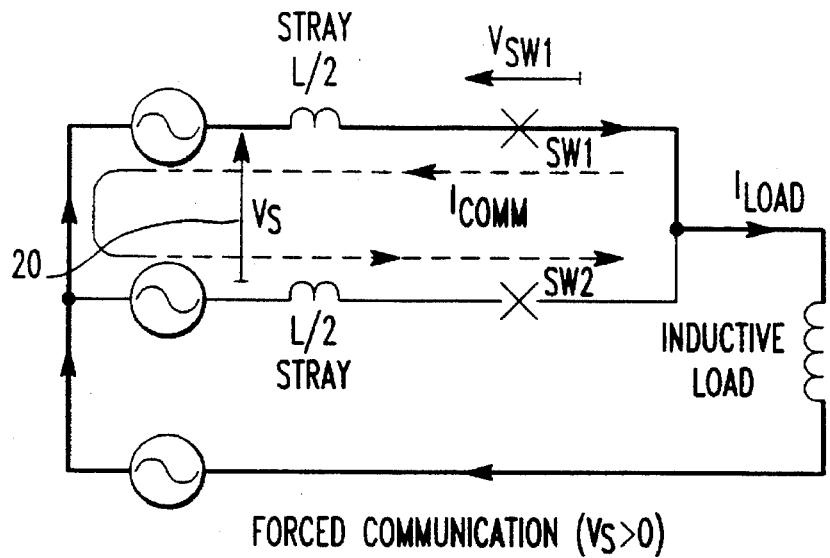
FIG. 3a is a diagrammatic representation of a forced commutation according to the present invention.
Figure 3B:
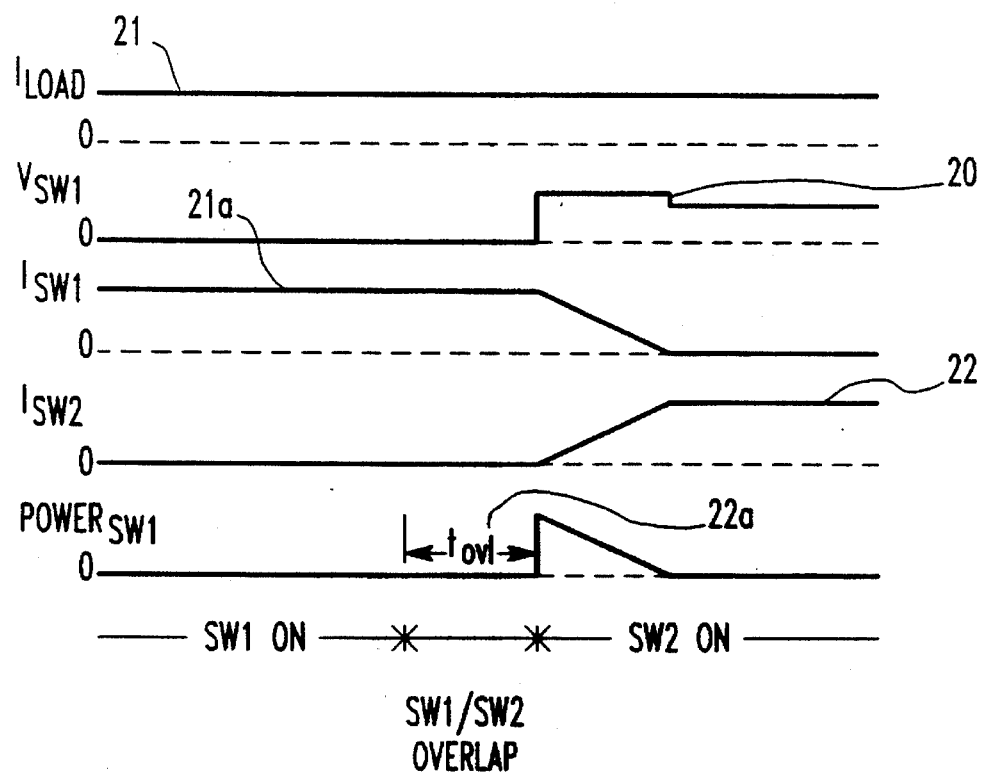

FIG. 3a illustrates a forced commutation with switch gating overlap according to the present invention. In this case, the commutation is forced at the end of the overlap period since it cannot occur naturally. FIG. 3b illustrates the qualitative states of the parameters pertinent to the forced commutation illustrated in FIG. 3a. In FIG. 3a, the polarity of the source voltage, 20, can be assumed to be positive, and the switch group in the figure is enabled for positive current conduction. In this case, the load current, 21, also flows through SW1 initially, as seen in trace 21a for the current through SW1. The first action taken is to turn ON the next switch in the switching sequence, SW2, while SW1 is left ON. SW2 will simply block the source voltage, no current will flow through SW2, and all of load current, 21, will flow through SW1, as seen in trace 21a. At the end of the overlap period 22a, SW1 is turned OFF and a commutation loop current rises until the load current 21 is completely transferred to SW2, as seen in trace 22 for the current through SW2.

In general, after the overlap period and depending upon the polarity of the source voltage, the load current will either have been partially or completely transferred to SW2 (i.e., as in FIG. 2a) or be still flowing in SW1 (i.e., as in FIG. 3a). At this point, SW1 is gated OFF, and any remaining current is force-commutated to SW2. During matrix converter operation, approximately half of the switching actions will be effected by completely or partially natural commutation. Where natural commutation occurs, the switching energy loss will be reduced. Also, when forced commutation occurs, the need for underlap period is eliminated because the oncoming switch is already ON when the outgoing switch is gated OFF.

Figure 4:
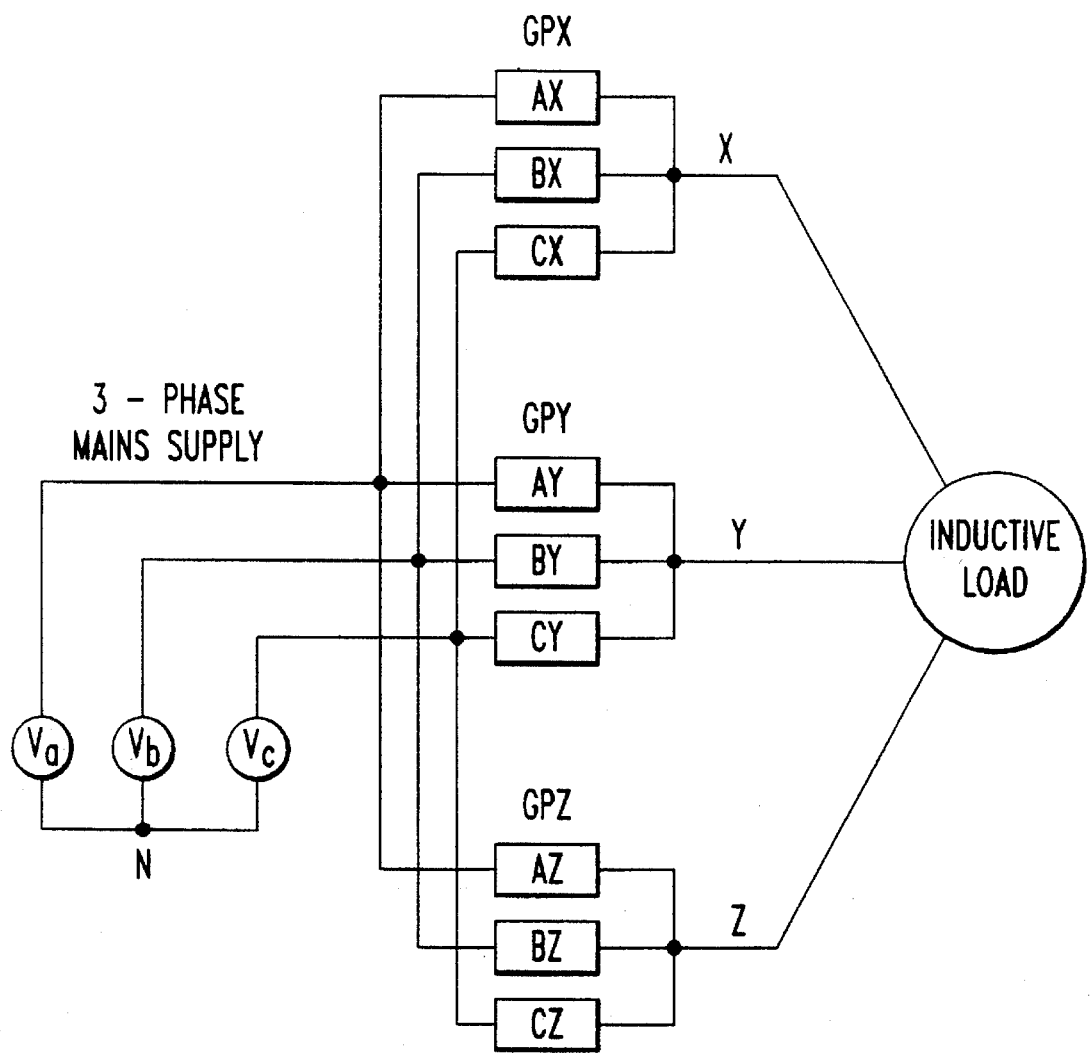
FIG. 4 is a diagrammatic representation of a basic matrix converter scheme for a three-phase power supply to an inductive load according to the present invention.

Referring to FIG. 4, a basic matrix converter scheme according to the present invention is shown using nine polarity-controlled, bi-directional switches grouped in three groups, GPX, GPY, and GPZ. One group, GPX, can include polarity-controlled, bi-directional switches AX, BX, and CX, for input phases A, B, and C, and the common output phase, X, respectively. Similarly, switches AY, BY, and CY constitute the second group, GPY, for common output phase Y. Switches AZ, BZ and CZ belong to the third group, GPZ, and common output phase Z. The current which is supplied to each phase X, Y, and Z, originates from power sources which generate the potentials VAN, VBN, and VCN, respectively. By selectively controlling the switches within each of groups GPX, GPY, and GPZ, the magnitude and frequency of the power delivered to inductive source may be regulated.

Examples of matrix converter controllers which provide such selective control of switch circuits may be found in U.S. Pat. Nos. 4,962,399 and 5,005,115. One factor which affects the topology and functionality of switching control circuits is the design of the power switch in each of the power switches in the matrix converter circuit.

Figure 5:
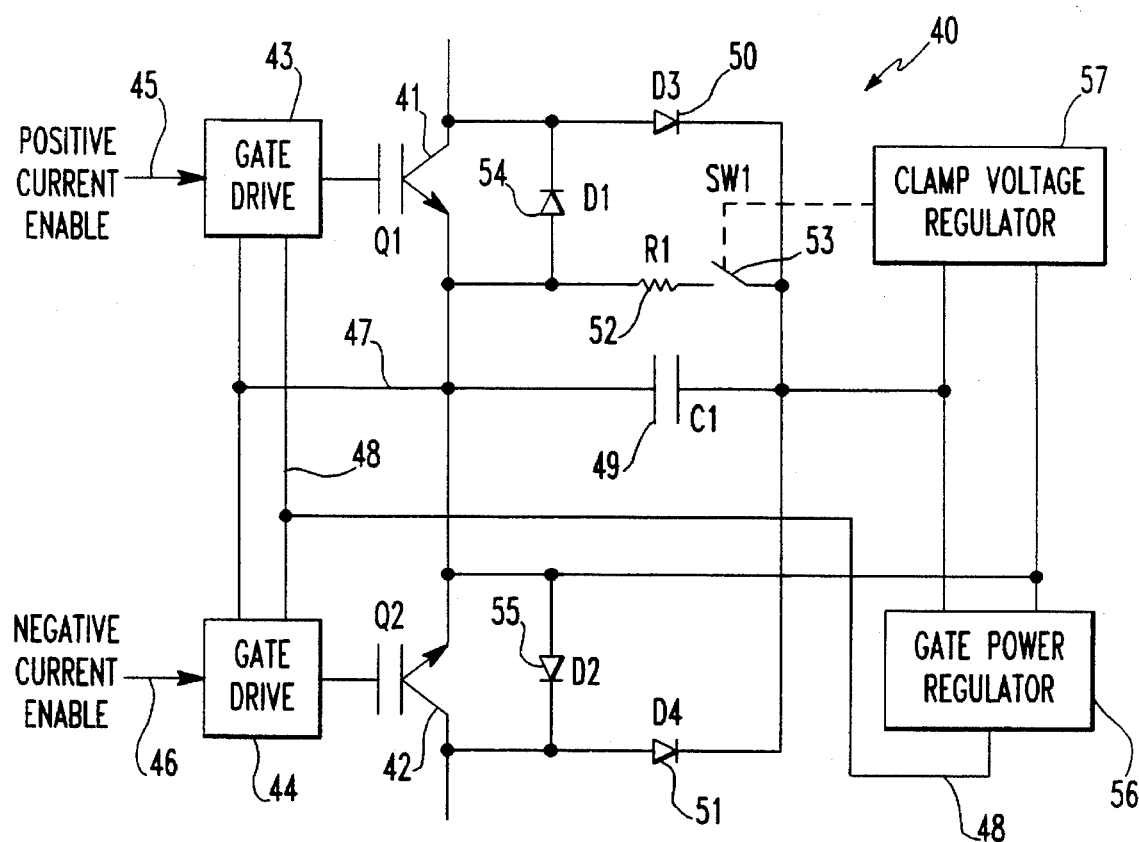
FIG. 5 is a schematic illustration of one embodiment of an AC polarity-controlled, bi-directional power switch according to the present invention.

Referring to FIG. 5, an AC power switch circuit 40 for implementation of one presently preferred embodiment of the invention herein is illustrated. Power switches 41, 42 may be connected together in anti-series, that is, the emitters of switches 41, 42 may be connected together. Switches 41, 42 can be a suitable static power switch, such as, for example, BJT, IGBT, FET, MCT, and the like. Switch 41 can be immediately controlled by positive current enable gate drive 43; switch 42 can be immediately controlled by negative current enable gate drive 44. In the presently preferred embodiment, gate drives 43, 44 share a common ground 47 and may be regulated by positive current enable input 45 or negative current enable input 46, respectively, and can be powered by gate power regulator 56, via its output 48. Together, switches 41, 42, gate drives 43, 44, inputs 45, 46, and regulator 56 can form a polarity-controlled bi-directional power switch as required in the present invention. In this circuit, gate power regulator 56 provides power for the gate drives 43 or 44 from the energy stored in the voltage clamping capacitor 49. Alternatively, the power for the gate drives could be derived from an independent source.

Diodes 54, 55 can act to bar the flow of current with an undesired polarity. When positive gate enable drive 43 turns ON switch 41, current with positive polarity may bypass switch 42 by flowing through diode 55. However, if the current polarity becomes negative, current flow can be stopped due to the reverse biasing of diode 55. Similarly, when negative gate enable drive 44 turns ON switch 42, current with negative polarity may bypass switch 41 by flowing through diode 54. In this instance, when the polarity of the current becomes positive, thereby reverse biasing diode 54, current flow through diode 54 can be stopped.

With switch 41 ON, and switch 42 OFF, switch circuit 40 is enabled for positive current flow. Current flows from the current source into the collector, and out of the emitter, of switch 41, into the anode, and out of the cathode, of diode 55 and out of switch 40 into the load. No substantial current flows through switch 42 or diodes 50, 51, or 54. With switch 41 OFF, and switch 42 ON, switch circuit 40 is enabled for negative current flow. Current flows from the current source into the collector, and out of the emitter, of switch 42, into the anode, and out of the cathode, of diode 54 and out of switch 40 into the load. No substantial current flows through switch 41 or diodes 50, 51 or 55.

At selected times when it desired to have all switch circuits in a switching group disabled, large voltages may be generated in the switching group because the inductive load current is interrupted. At such times, switches 41, 42 are both OFF. Voltage clamping can be provided by voltage clamping capacitor 49 which acts in concert with diodes 50, 51, clamping limiter resistor 52, clamp voltage regulator switch 53 and clamp voltage regulator 57. When regulator 57 senses that the voltage across capacitor 49 exceeds a predetermined upper threshold value, regulator 57 can initiate voltage clamping by closing switch 53, thereby permitting current to shunt through resistor 52, thereby dissipating the voltage built up across capacitor 49. Similarly, when the voltage of capacitor 49 falls below a predetermined lower threshold value, regulator 57 can cease voltage clamping by opening switch 53.

Figure 6:
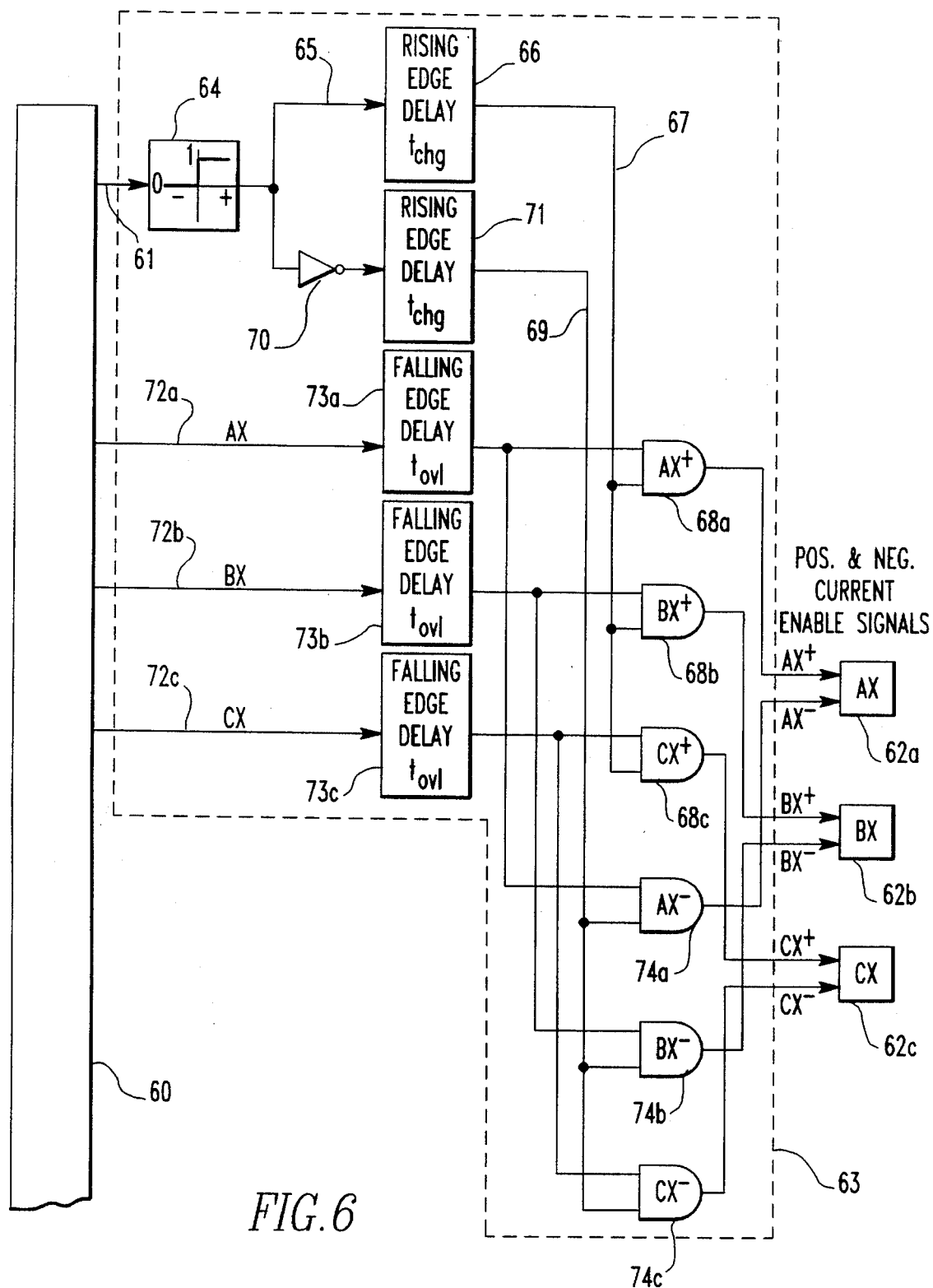
FIG. 6 is a schematic illustration of one embodiment of a switch gating control circuit according to the present invention.

In reference to FIG. 6, matrix converter controller 60 generates a group current demand reference signal 61 which is to be processed by switch gating control circuit 63 to control the operation of switching group 62a, 62b, 62c. The polarity of signal 61 is sensed and used to determine the current polarity which is desired for the individual AC power switch circuits in group 62a, 62b, 62c for a particular switching sequence. Reference signal 61 can be conditioned by comparator 64 to generate a polarity state control signal 65. It may also be desirable to determine the desired current polarity using other indicia in addition to, or in substitution for, signal 61 such as, for example, actual current polarity.

Signal 65 can be further conditioned by rising edge delay device 66 to provide a polarity enable control signal 67 to positive current enable gates 68a, 68b, 68c where the HIGH state of 67 corresponds to "ENABLED". Gates 68a, 68b, 68c can supply a positive current enable input to individual switch circuits in group 62a, 62b, 62c. Signal 65 can also be inverted and passed through rising edge delay device 71 to provide a complementary control signal 69 to negative current enable gates 74a, 74b, 74c where the HIGH state of 69 corresponds to "ENABLED". Gates 74a, 74b, 74c can supply a negative current enable input to individual switch circuits in group 62a, 62b, 62c. The rising edge delay circuits 66 and 71 provide a brief "dead time" when current polarity changes. During this dead time, neither positive nor negative conduction is enabled.

The signals 67, 69, can create mutually exclusive conduction states for gates 68a, 68b, 68c and 74a, 74b, 74c for a given polarity. Thus, the outputs of negative current enable gates 74a, 74b, 74c can be disabled when the outputs of gates 68a, 68b, 68c are enabled, and vice versa. Whenever a change in polarity selection is indicated by signal 61, a small underlap period may be selectively added by edge delay devices 66, 71, to the commutation process by momentarily disabling current enable gates 68a, 68b, 68c, 74a, 74b, 74c, respectively, which, in turn, can disable all switches in group 62a, 62b, 62c.

Continuing in FIG. 6, matrix converter controller 60 can also provide gating control circuit 63 with switch selection control signals 72a, 72b, 72c for each of the AC power switch circuits in group 62a, 62b, 62c. Signals 72a, 72b, 72c can be used to determine which power switch circuits within group 62a, 62b, 62c are enabled and operative at any moment according to some predetermined switch selection sequence. Each of signals 72a, 72b, 72c may be conditioned by interposing edge delay devices 73a, 73b, 73c between controller 60 and current enable gates 68a, 68b, 68c, 74a, 74b, 74c. In the presently preferred embodiment, it is preferred that edge delay devices 73a, 73b, 73c effect falling edge delays where the LOW state corresponds to a request to disable the associated switch. The time delay thus imposed by delay devices 73a, 73b, 73c can serve as the switching overlap time, or time during which any two switches of group 62a, 62b, 62c are enabled simultaneously.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the invention which is to be given the full breadth of the following claims and any and all embodiments thereof.

I claim:

1. An AC-to-AC converter for connection between an input power source and an output load, said converter comprising:

a plurality of switch groups;

each of said plurality of switch groups having a plurality of switch means for selective unidirectional control of current flow in either of two directions;

each of said plurality of switch groups being associated with a corresponding common output phase line;

each of said plurality of switch means being associated with a respective input line phase;

each of said plurality of switch groups having a gating control means for delaying the turn-OFF of each of said plurality of switch means within respective ones of said plurality of switch groups by an overlap period without delaying the turn-ON of each of said plurality of switch means within respective ones of said plurality of switch groups so that two of said plurality of switch means within said switch group selected for conduction in sequence are simultaneously enabled for conduction during at least a portion of said overlap time period; and said gating control means being connectable with respective ones of said plurality of switch means within one switching group and interposed between said respective ones of said plurality of switch means and a matrix converter controller.

2. The apparatus of claim 1 wherein said each of said plurality of switch groups comprises:

a plurality of polarity-controlled, bi-directional power switches; and each of said plurality of power switches being connectable with said common output phase line, and respective ones of said power switches being connectable with ones of such respective input line phases.

3. The apparatus of claim 2 wherein each of said plurality of polarity-controlled, bi-directional power switches comprises: a positive polarity power switch being connectable with said positive current gate enable drive, said positive polarity power switch being connectable with one of such respective input line phases;

a negative polarity power switch being connectable with said negative gate current enable drive, said negative polarity power switch being connectable with said positive polarity power switch, said negative polarity power switch being connectable with such corresponding common output phase line;

a positive current enable gate drive being connectable with said at least one switch gating control circuit;

a negative current enable gate drive being connectable with said at least one switch gating control circuit, said negative current enable gate drive being connectable with said positive current enable gate drive;

a negative current polarity inhibition device being connectable with said positive polarity power switch;

a positive current polarity inhibition device being connectable with said negative polarity power switch; and a voltage clamping device being connectable with said positive polarity power switch, said clamping device being connectable with said negative polarity power switch, said clamping device being connectable with said negative current polarity inhibition device, said clamping device being connectable with said positive current polarity inhibition device, said clamping device being connectable with said positive gate current enable drive, said clamping device being connectable with said negative gate current enable drive.

4. The apparatus of claim 3 wherein said positive current polarity inhibition device comprises a diode and said negative current polarity inhibition device comprises a diode.

5. The apparatus of claim 3 wherein said voltage clamping device comprises:

a positive polarity diode being connectable with said positive polarity power switch;

a negative polarity diode being connectable with said negative polarity power switch, said diode being connectable with said positive polarity diode;

a resistor being connectable with said positive current polarity inhibition device, said resistor being connectable with said negative current polarity inhibition device, said resistor being connectable with said positive polarity power switch, said resistor being connectable with said negative polarity power switch;

a clamping switch being connectable with said resistor, said clamping switch being connectable with said positive polarity diode, said clamping switch being connectable with said negative polarity diode;

a capacitor being connectable with said clamping switch, said capacitor being connectable with said positive polarity diode, said capacitor being connectable with said negative polarity diode, said capacitor being connectable with said positive polarity power switch, said capacitor being connectable with said negative polarity power switch, said capacitor being connectable with said positive gate current enable drive, said capacitor being connectable with said negative gate current enable drive;

a clamp voltage regulator being connectable with said clamping switch, said voltage regulator being connectable with said capacitor; and a gate power regulator being connectable with said voltage regulator, said power regulator being connectable with said positive polarity power switch, said power regulator being connectable with said negative polarity power switch, said power regulator being connectable with said positive gate current enable drive and said power regulator connectable with said negative gate current enable drive.

6. The apparatus of claim 1 wherein each of said gating control means comprises:

a comparator being connectable with a matrix converter controller, said controller impressing a reference signal upon said comparator;

a polarity enable selection circuit being connectable with said comparator;

at least one current polarity enable circuit, each of said at least one current polarity enable circuit being connectable with said polarity enable selection circuit, each of said at least one current polarity enable circuit being connectable with respective ones of said plurality of polarity-controlled, bi-directional switches; and at least one switch selection control circuit, each of said at least one switch selection control circuit being connectable with said matrix converter controller, each of said at least one switch selection control circuit being connectable with one of said at least one current polarity enable circuit.

7. A commutation method in a direct AC-to-AC converter connected to an output load and including plurality of bilateral switch circuits connected in groups, each switch circuit in one switching group being associated with a corresponding common output phase line and said switch circuits of each group being associated with respective input line phases, said commutation method comprising:

determining a preselected polarity of current to be conducted to such output load; and selectively conducting said current of said preselected polarity unidirectionally to such output load for a first preselected period;

wherein said selectively conducting step further comprises:

selectively enabling at least one of such switch groups to unidirectionally conduct said current of said preselected polarity to such output load for a second preselected period:

selectively enabling a first of such bilateral switch circuits of said at least one of such switch groups to conduct to such output load for said second preselected period said current of said preselected polarity;

selectively enabling a second of such bilateral switch circuits of said at least one of such switch groups to conduct to such output load for a third preselected period said current of said preselected polarity; and disabling said first of such bilateral switch circuits after said second preselected period has expired.

8. The method of claim 7 wherein said determining of said preselected polarity further comprises detecting a signal representative of an actual current polarity.

9. The method of claim 7 wherein said second preselected period during which said first of such bilateral switch circuits is selectively enabled is at least partially concurrent with said third preselected period during which said second of such bilateral switch circuits is selectively enabled.

10. The method of claim 7 wherein said selective enabling of said second of such bilateral switch circuits of said at least one of such switch groups is preceded by a selective disabling of each switch circuit of said at least one of such switch groups.

11. The method of claim 7 wherein said determining of said preselected polarity further comprises detecting a reference signal.

12. The method of claim 11 wherein said determining of said preselected polarity further comprises detecting a signal representative of an actual current polarity.

* * * * *